UNITED STATES PATENT OFFICE.

JACQUES PERL, OF BERLIN, GERMANY.

DEPILATING COMPOSITION.

SPECIFICATION forming part of Letters Patent No. 450,032, dated April 7, 1891.

Application filed October 18, 1890. Serial No. 368,579. (Specimens.) Patented in Germany September 24, 1889, No. 54,127; in France November 7, 1889, No. 201,778, and in England November 12, 1889, No. 18,029.

*To all whom it may concern:*

Be it known that I, JACQUES PERL, a subject of the King of Prussia, residing at Berlin, Prussia, Germany, have invented a new and useful Composition for the Preparation of Depilatories, (for which I have obtained Letters Patent in France, No. 201,778, dated November 7, 1889; in Great Britain, No. 18,029, dated November 12, 1889, and in Germany, No. 54,127, dated September 24, 1889,) whereof the following is a specification.

This invention relates to depilatories or substances capable of removing hair from the skin or other parts of the body.

The depilatories heretofore brought into the market contain poisonous substances—such as soluble barium, salts, and arsenious trisulphide—or they possess the property of injuriously affecting the skin, or are apt to decompose with evolution of sulphureted hydrogen. In view of obviating these defects I use as main ingredients of my improved depilatory the sulphureted derivatives of strontium in any of their chemical forms—viz., the monosulphide, the polysulphide, and the sulphhydrates, the said substances being non-poisonous and harmless to the skin, while they act as energetical destroyers of the hair. The most advantageous for the purpose of my invention is the monosulphide of strontium. Certain precautions must, however, be taken in its preparation and its use. In the first place the efficacy of the preparation increasing with its fineness renders it necessary to treat the raw material very carefully. In the second place, as the pure strontic monosulphide acts very energetically it must for the greater part of its uses be moderated in strength by mixing it with suitable attenuants.

In carrying out my invention I take strontic sulphates—such as the native sulphate (celestine)—and reduce the same to a very fine powder, which I treat by elutriation. If the artificial sulphate produced by precipitation is used, the same is available at once on account of its extreme fineness. The finely-divided sulphate I mix with substances capable of reducing the same at high temperature, such as charcoal, starch, and the like. I mold the mixture into tablets, balls, or other suitable forms and calcine these at a red heat, whereby the strontic sulphate is converted into monosulphide of strontium. I pulverize the product of reaction to a fine powder, which I thereupon attenuate by mixing it intimately with powdered solid substances innocuous to the skin, preferring to employ such as are at the same time energetic absorbents of moisture—for example, fossil meal, carbonate of calcium obtained by precipitation, and others. After attenuation the preparation is ready for use as a depilatory.

Instead of the monosulphide of strontium, I may use the strontic polysulphides produced in the usual way. The preparations thus obtained give, however, depilatories whose action is less energetic. I can, furthermore, also have recourse to the sulphhydrate of strontium; but this substance presents less advantage on account of its liability to decomposition.

The quantity of the attenuant may be from two to eight times the weight of the sulphureted strontic derivative, and, in general, the more thereof may be added the finer the principal substance is divided. The highest proportion is suitable for the monosulphide obtained from precipitated sulphate of strontium.

The described depilatory is available in all cases in which hairs are to be removed from the skin, especially from the human face or arms. For applying the same a suitable quantity of the dry substance is mixed with some water to form a thick pulp. A layer of this pulp about one-eighth of an inch in thickness is put on the part of the body to be depilated and is washed off again after from two to four minutes.

Numerous experiments have shown that the soluble strontic salts do not in any wise manifest toxical or irritating qualities. The depilatories prepared from the aforesaid sulphureted derivatives of strontium are therefore perfectly harmless to the human body and agreeable in use.

I claim as my invention—

The new composition serviceable as depilatory, which consists in a mixture of one or more powdered sulphureted derivatives of strontium and a powdered attenuant innocuous to the skin, substantially as described.

In testimony whereof I have hereunto set my hand in the presence of two subscribing witnesses.

JACQUES PERL.

Witnesses:
   HENRY SPRINGMANN,
   WILHELM LINDMAR.